UNITED STATES PATENT OFFICE.

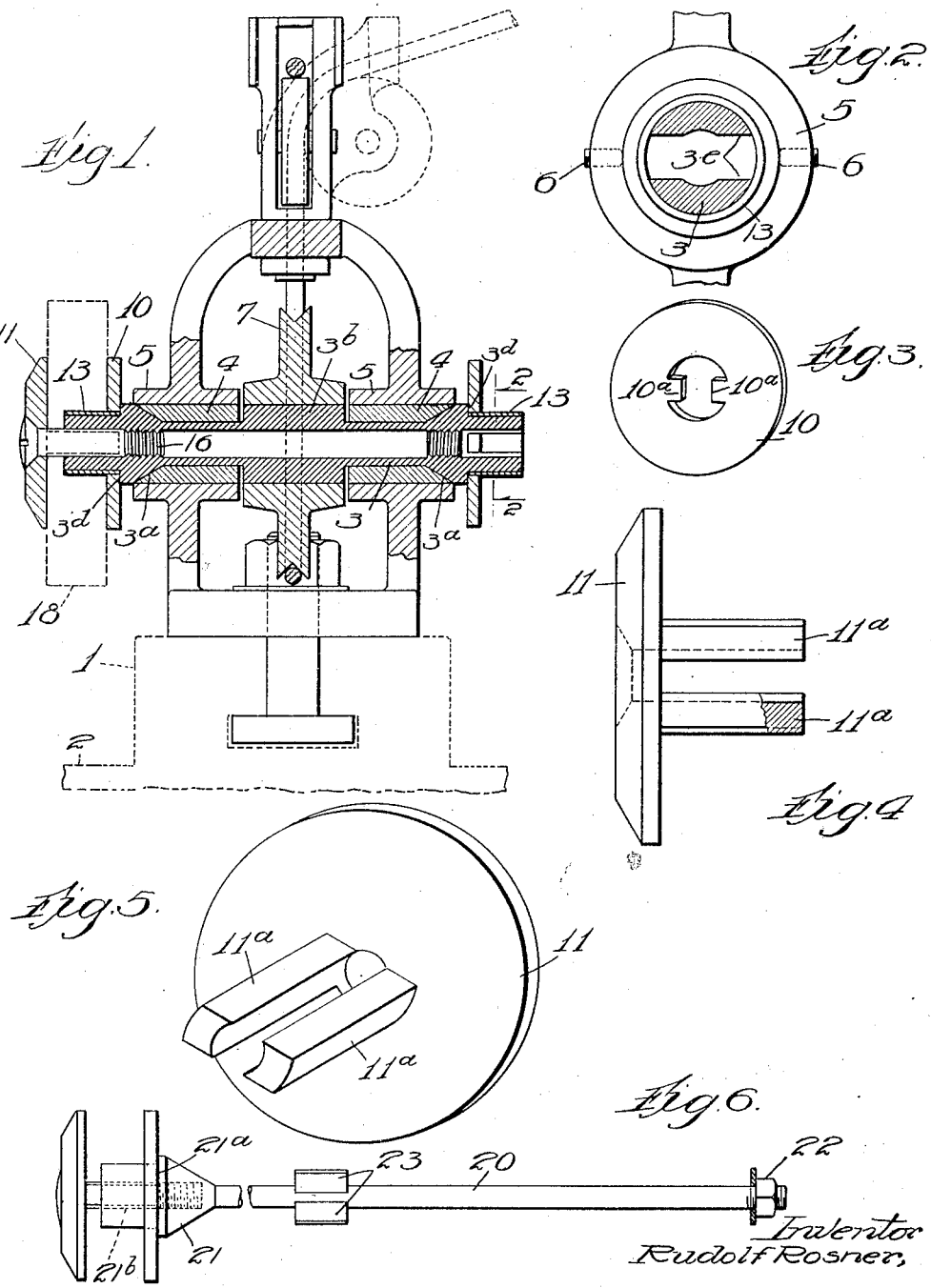

RUDOLF ROSNER, OF CHICAGO, ILLINOIS.

MILLING AND GRINDING TOOL HOLDER.

1,329,857.     Specification of Letters Patent.     Patented Feb. 3, 1920.

Application filed November 16, 1918. Serial No. 262,786.

*To all whom it may concern:*

Be it known that I, RUDOLF ROSNER, a citizen of the United States, residing at Chicago, in the county of Cook and State of Illinois, have invented certain new and useful Improvements in Milling and Grinding Tool Holders, of which the following is a specification, reference being had to the accompanying drawings, forming a part thereof.

The purpose of this invention is to provide an improved construction for a milling or grinding tool holder. It consists in the elements and features of construction shown and described as indicated in the claims.

In the drawings:

Figure 1 is a section axial with respect to the shaft or spindle of a grinding or milling tool holder embodied in this invention and the carriage or bearing for the same.

Fig. 2 is a section at the line, 2—2, on Fig. 1.

Fig. 3 is a plan view of the interior one of two flanges or washers for clamping a milling or grinding tool on the spindle.

Fig. 4 is a plan view of the outer clamping flange or washer.

Fig. 5 is a perspective view of said outer clamp or flange.

Fig. 6 is a side elevation of an extensor rod adapted to be employed for extending the spindle of the structure shown in Fig. 1 to carry the tool at a greater distance from the carriage in which the spindle is journaled.

In the drawings 1 represents the carriage for a milling or grinding tool in a customary form of such carriage for mounting it upon the bed 2 of a lathe or other machine in connection with which the tool is to be used. 3 is the shaft or spindle for carrying the tool in said carriage. This shaft or spindle is formed with cone shoulders, $3^a$, $3^a$, for adapting it to be kept accurately fitted in its bearings against longitudinal movement. 4, 4, are split bushings which constitute the bearings for the cone-shouldered spindle, said bushings having their opposite outer ends respectively counterbored conically to fit the cone shoulders of the spindle. These bushings are designed to be adjustably secured in place in the bearing bosses, 5, 5, of the carriage by means of set screws, 6, 6, set through said bosses, and impinging against either or both of the halves of said bushings respectively. The spindle has an enlargement, $3^b$, intermediate its ends, making the diameter of this part substantially equal to the outer diameter of the bushings, the same being such with respect to the interior diameter of the drive pulley, 7, that the spindle with said bushings upon it can be entered endwise into the carriage and through the pulley, the latter being then secured by set screws in the customary way.

The spindle is axially hollow. At one end outside the cone shoulder it is enlarged to a diameter only sufficiently less than the greatest diameter of the cone shoulder to leave a margin for a stop shoulder, $3^a$, at the outer end of the cone, and through this enlargement it is notched or split from the end approximately to the plane of the said stop shoulder of the cone. The length of this enlarged and notched or split portion is designed to be sufficient to accommodate the thickness of the tool which is to be mounted upon it for rotation by it. For clamping the tool on this split end of the spindle inner and outer washers or clamping flanges are provided, the inner flange, 10, having its central aperture furnished with interiorly-projecting teeth or splines, $10^a$, adapted to engage the notch, $3^c$, in the end of the spindle so as to be held non-rotatably with respect to the spindle. The outer clamping flange 11, has what may be termed a forked or split hub consisting of two projections, $11^a$, $11^a$, which constitute pins or splines which are adapted to enter and occupy the notch or slot, $3^c$, in the end of the spindle, so that said outer flange as well as the inner flange is non-rotatable with respect to the spindle. To prevent the forked or split spindle end from having its forked terminals spread by the stress of rotation of the tool which will be engaged and clamped between the flanges when that tool is performing its work, there is provided a sleeve, 13, which fits closely about the enlarged end of the spindle, encompassing its notch or slot and the feathers or splines of the outer flange, 11, engaged therein. The axial bore of the spindle is interiorly threaded beyond the notched end for a sufficient distance to receive the threaded end of a bolt, 16, which is adapted to be inserted through the central aperture of the outer clamping flange, 11, and which has a head adapted to engage against the outer side of said flange for crowding it inwardly along the spindle to clamp the tool indicated in dotted line at 18, between the two clamping flanges.

For the purpose of extending the spindle so as to adapt it to carry the tool at a greater distance from the carriage, there is provided an extensor rod, 20, which is adapted to extend through the entire length of the axial aperture of the spindle, said extensor rod having one end threaded to receive a nut, 22, and the other end furnished with an enlargement, 21, having a stop shoulder, 21$^a$, and the end notch or slot, 21$^b$, in all respects similar to the enlarged terminal of the spindle, 3, which enlargement receives the tool when the extensor is in use, and on which there may be applied the clamping flanges and sleeve already described for holding the tool. Intermediate the ends of this extensor it is provided with a cross bar amounting to two diametrically opposite splines or feathers, 23, for engaging the notch, 3$^e$, of the spindle, so that the extensor will be rotated with and by the spindle. The nut, 22, will serve to draw the extensor longitudinally with respect to the spindle to seat the cross-head or spline of the extensor in the notch, 3$^e$, of the spindle; and a sleeve, 13, may be applied outside said split head of the spindle for preventing its spreading, as in case when the tool is mounted in the spindle at that point.

I claim:—

1. In combination with a spindle having an axial bore interiorly threaded and split by a diametric notch extending in from the end; a tool-clamping flange or washer adapted to be passed onto the spindle, having interiorly-projecting splines or feathers to engage the notch in the spindle end; a sleeve fitting over the split portion of the spindle and forming a seat for the tool; an outer washer or clamping flange having a hub which fits the notch in the end of the spindle and which is axially apertured, and a headed bolt threaded to engage the interior thread of the spindle, inserted through the outer flange, its head engaging said flange.

2. In combination with a spindle and a flange against which a tool may be clamped on the spindle for rotation thereby, the spindle end being split; a sleeve fitting on the split portion to reinforce it against spreading; a disk or flange for clamping a tool on the spindle for rotation thereby having projections which engage the split of the spindle, and means for forcing the flange in axial direction on the spindle.

3. In the construction defined in claim 2, the clamping flange having its said projections extending parallel to the axis within the sleeve and engaging the notch of the spindle inside the sleeve.

4. In combination with an axially-apertured spindle having at one end a diametric notch, an extensor for the spindle consisting of a rod which extends through and fits the axial bore of the spindle having one end threaded to receive a nut and having intermediate its ends a spline or feather to engage the notch on the spindle.

In testimony whereof, I have hereunto set my hand at Chicago, Illinois, this 12th day of November, 1918.

RUDOLF ROSNER.